US008740244B2

(12) United States Patent
Obadia (10) Patent No.: US 8,740,244 B2
(45) Date of Patent: Jun. 3, 2014

(54) AIRBAG GUIDE BY SEAT BELT (71) Applicant: Zodiac Aerospace, Issoudun (FR)

(72) Inventor: Jean-Marc Obadia, Maubec (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 13/676,183

(22) Filed: Nov. 14, 2012

(65) Prior Publication Data

US 2013/0127140 A1    May 23, 2013

Related U.S. Application Data (60) Provisional application No. 61/562,838, filed on Nov. 22, 2011.

(51) Int. Cl.
*B60R 21/18* (2006.01)
(52) U.S. Cl.
CPC ...................................... *B60R 21/18* (2013.01)
USPC ........................................ 280/733; 280/730.2
(58) Field of Classification Search
USPC ............... 280/730.2, 733, 801.1, 801.2, 808; 297/468, 470–472, 481–485; 24/115 F, 24/602, 625, 115 G
See application file for complete search history.

(56) References Cited

U.S. PATENT DOCUMENTS

| 3,820,842 | A | * | 6/1974 | Stephenson | 280/733 |
| 5,062,662 | A | * | 11/1991 | Cameron | 280/733 |
| 5,161,821 | A | * | 11/1992 | Curtis | 280/730.2 |
| 5,288,104 | A | * | 2/1994 | Chen | 280/733 |
| 5,465,999 | A | * | 11/1995 | Tanaka et al. | 280/733 |
| 5,871,230 | A | | 2/1999 | Lewis | |
| 5,947,513 | A | * | 9/1999 | Lehto | 280/733 |
| 6,059,311 | A | * | 5/2000 | Wipasuramonton et al. | 280/729 |
| 6,189,921 | B1 | * | 2/2001 | Takeuchi | 280/733 |
| 6,276,715 | B1 | * | 8/2001 | Takeuchi | 280/733 |
| 6,460,881 | B1 | * | 10/2002 | Adomeit | 280/733 |
| 7,712,773 | B2 | * | 5/2010 | Walston | 280/730.2 |
| 2002/0027344 | A1 | | 3/2002 | Decomps et al. | |
| 2002/0171233 | A1 | * | 11/2002 | Grace | 280/733 |
| 2006/0196715 | A1 | * | 9/2006 | Fujishiro et al. | 180/271 |
| 2007/0063493 | A1 | * | 3/2007 | Higuchi et al. | 280/733 |
| 2012/0038137 | A1 | * | 2/2012 | Wipasuramonton et al. | 280/733 |

FOREIGN PATENT DOCUMENTS

| DE | 19959057 A1 | 10/2000 |
| EP | 1479570 A1 | 11/2004 |
| EP | 1663731 B1 | 6/2006 |
| EP | 2360067 A2 | 8/2011 |

(Continued)

OTHER PUBLICATIONS

Extended Search Report dated Feb. 4, 2013 in European Application No. 12192689.

(Continued)

*Primary Examiner* — James English
(74) *Attorney, Agent, or Firm* — Kilpatrick Townsend & Stockton LLP; Kristin M. Crall, Esq.; Dean W. Russell, Esq.

(57) ABSTRACT

Embodiments of the invention provide airbags that are guided by the seat belt, but that are not installed or incorporated into the seat belt itself. The airbags may be installed on a seat side, seat backrest, or in the seat armrest. The airbags are associated with a guiding strip that uses the seat belt to guide the airbag into the proper position in front of the passenger.

13 Claims, 6 Drawing Sheets

(56) References Cited

FOREIGN PATENT DOCUMENTS

| | | |
|---|---|---|
| GB | 2262720 A | 6/1993 |
| WO | 9915368 A1 | 4/1999 |
| WO | 0100456 A1 | 1/2001 |
| WO | 2005030529 A2 | 4/2005 |
| WO | 2007073944 A1 | 7/2007 |
| WO | 2009117008 A1 | 9/2009 |

OTHER PUBLICATIONS

Examination Report dated Jan. 16, 2014 in EP Patent Application No. 12192689.3, 3 pages.

* cited by examiner

AIRBAG GUIDE BY SEAT BELT

CROSS REFERENCE TO RELATED APPLICATIONS

This application claims the benefit of U.S. Provisional Application Ser. No. 61/562,838, filed Nov. 22, 2011, titled "Airbag Guide by Seat Belt," the entire contents of which are hereby incorporated by reference.

FIELD OF THE INVENTION

Embodiments of the present invention relate generally to airbags for use in aircraft and other passenger transport vehicles. The airbags are designed to safely interrupt a passenger's forward momentum in the event of a crash condition. Rather than storing the airbag in the seat belt, which can make the seat belt thick and uncomfortable, the airbag is stored elsewhere on the seat (e.g., in the backrest, armrest, or seat pan) and is generally guided by the seat belt.

BACKGROUND

Airbags are occupant restraining devices, which typically include a flexible envelope or "bag" that is designed to inflate rapidly during a collision in order to prevent the vehicle's occupants from striking interior objects located in front of (or, in some cases, on the side of) the occupant. In automobiles, airbags are designed to prevent occupants from striking the steering wheel, the vehicle door, a window, or any other interior objects. In aircraft, airbags are designed to prevent passengers from striking the seat in front each passenger, the tray tables, a window, or any other interior objects. Airbags on passenger rail cars (such as trains, monorails, trolleys), motorcycles, and other passenger transport vehicles work similarly.

Most aircraft provide airbags either positioned in the back of each seat (so as to deploy for the passenger sitting behind that seat) or in the seat belts. Passengers sitting in the front seat or bulkhead in the aircraft do not have a seat in front of them, so in this instance, it is particularly necessary or useful to position the airbag in the passenger seat belt.

Providing passenger airbags incorporated into every seat or every seat belt (as opposed to the back of the seat in front) can ease manufacture and implementation. This can be particularly beneficial on an aircraft or other passenger transport vehicles, where a number of seats are positioned in rows. As opposed to airbags installed on a seat in front of each passenger or other location, installing one or more airbags in conjunction with each seat is more seamless for integration. This way, each seat has an airbag associated therewith, regardless of how the seats are arranged in the aircraft.

However, airbags that are incorporated into seatbelts can be uncomfortable due to the weight and bulkiness of the airbag material. Airbags in seat belts are also not particularly stable. Accordingly, it is desirable to provide an airbag that is integrated into or otherwise associated with each seat, but that avoids integrating the airbag directly into the seat belt itself.

BRIEF SUMMARY

Embodiments of the invention described herein thus provide airbags that are guided by the seat belt, but that are not installed or incorporated into the seat belt itself. The airbags may be installed on a seat side, seat backrest, or in the seat armrest. The airbags are associated with a guiding strip that uses the seat belt to guide the airbag into the proper position in front of the passenger.

DETAILED DESCRIPTION

Figure 1:
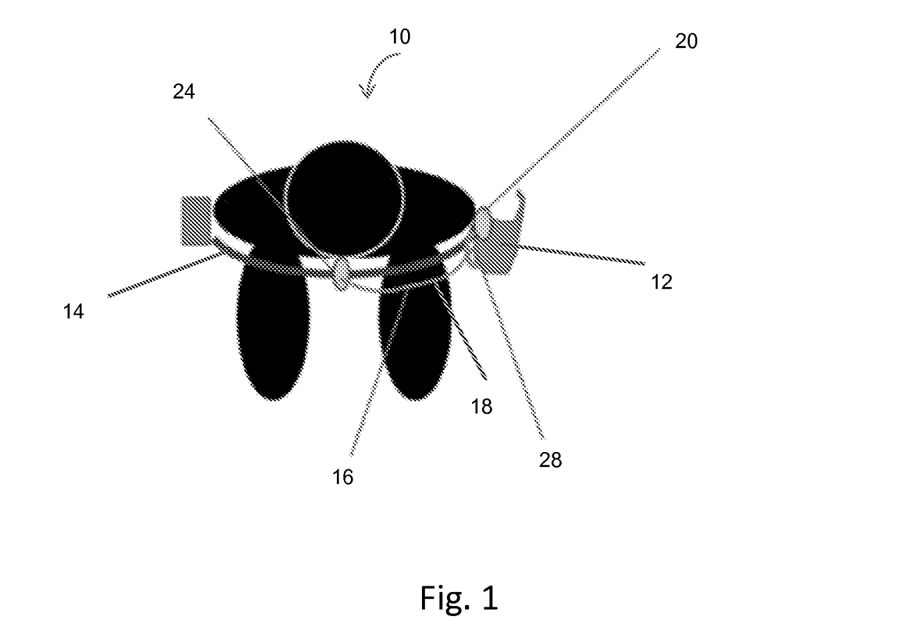
FIG. 1 shows a top plan view of a passenger in a seat that has an airbag system installed thereon.
Figure 2:
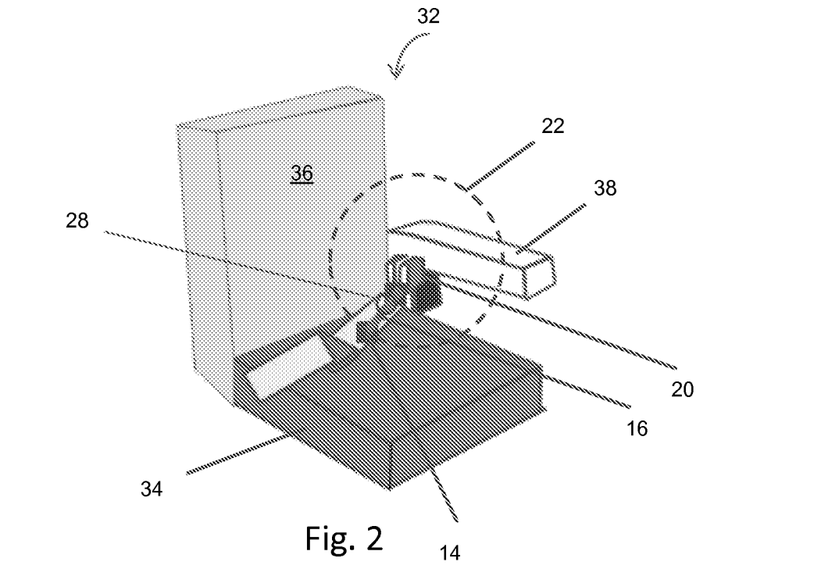
FIG. 2 shows a side perspective view of the seat of FIG. 1.
Figure 4:
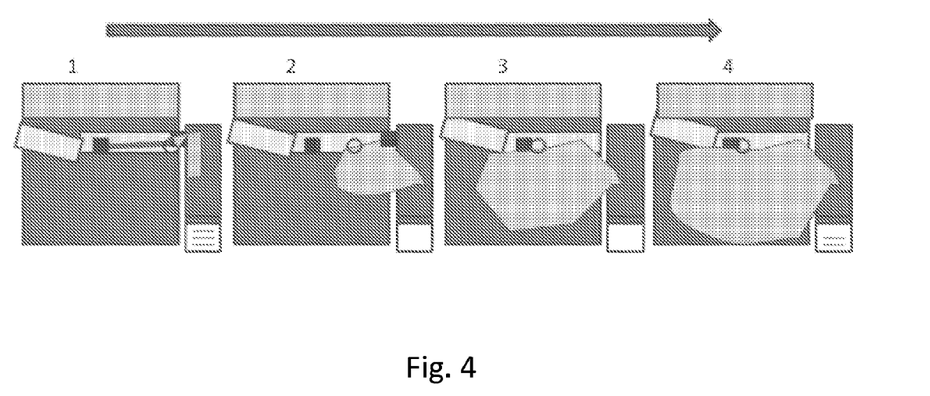
FIG. 4 shows a storyboard of various airbag systems as positioned during airbag deployment.

Embodiments of the present invention provide an airbag system that is guided by a seat belt. In use, the seat belt is provided with a guide that directs a deployed airbag to the proper position, in front of the passenger. As shown in FIG. 1, in one embodiment, the airbag system 10 features an airbag 12 that is secured on a side of the passenger seat, such as in the seat pan, the seat back, or the arm rest. The system includes a traditional seat belt 14 provided with a guiding strip 16. The guiding strip 16 is generally a cable, cord, or strip associated with the seat belt 14 that functions much like a curtain rod axis. When deployed, the airbag slides across the guiding strip axis 18 (which has somewhat of a curved trajectory, due to the curved nature that a seat belt takes when positioned across a passenger's lap). The guiding strip may be a thin piece of metal, wire, plastic, or any other appropriate material that can withstand pulling action and provide a guide function. (As described below, the guiding strip may be provided underneath a cover to prevent passenger tampering, unsightliness, or any discomfort from the component.) In this embodiment, the guiding strip 16 is secured at two fixed points 20, 24. One first fixed point 20 is positioned on the airbag, and is located generally alongside the passenger. It may be fixed in relation to a seat component or at an edge of the seat belt 14. The referenced seat component 22 is generally located alongside or at the side of the passenger and may be the side of the seat backrest, the side of the seat (e.g., the seat pan or the seat cushion), the edge of the armrest nearest the passenger's elbow, or any other appropriate location at the side of the passenger when s/he is in a seated position. The second fixed point 24 is secured further along the seat belt 14. In the embodiment shown, the second fixed point 24 is positioned about midway along the length of the seat belt, or at the middle portion 26 of the seat belt. FIGS. 2 and 4 show the fixed points as square points.

A sliding component 28 is provided that can slide or otherwise travel along the guiding strip 16. In one embodiment, the sliding component 28 may be a small ring that slides along the guiding strip, much like a curtain ring slides along a curtain rod or wire when pulled. The sliding component 28 is secured or otherwise has some portion connected to the airbag 12, such that movement of the sliding component 28 causes subsequent movement of the airbag 12. (The airbag is the "curtain" in the curtain, rod and ring analogy.) The airbag may have a buckle, ring, loop, or some feature that cooperates with or secures it to the sliding component 28. FIGS. 2 and 4 show the sliding component 28 as a circular point.

In the airbag stowage position, shown in FIGS. 1 and 2, the sliding component 28 is positioned near the first fixed point 20. FIG. 2 illustrates a passenger seat 32 having an airbag system 10 installed according to this embodiment. The seat 32 has an seat pan (not shown) covered by a cushion 34, a seat back covered by a seat back cushion 36, and an armrest 38. The airbag stowage position may be below the armrest 38, near a junction of the seat back 36 and seat cushion 34, along the armrest, or anywhere else the keeps the airbag close at hand, but not uncomfortably positioned directly on the seatbelt. It is generally desirable that the airbag 12 not be secured directly to the seat belt, which adds bulk and weight to the seat belt itself. Instead, the airbag 12 is positioned alongside the passenger, and is associated with the seat or the armrest or both.

Figure 3:
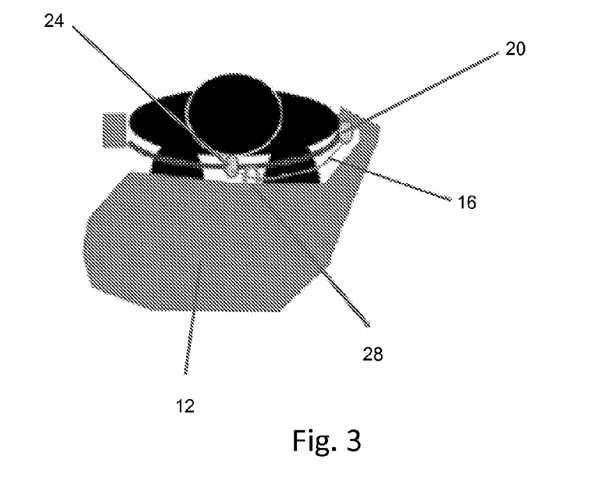
FIG. 3 shows a top plan view of the airbag system being deployed.

As shown in FIGS. 3 and 4, when the airbag 12 is to deployed (as indicated by on-board sensors that detect a crash condition or any other deployment system) and expands from the stored position shown to an inflated state, the sliding component 28 moves from its stowage position, sliding along the guiding strip 16. As the airbag 12 is deployed, the sliding component 28 moves along the guiding strip 16 in order to ensure that the airbag is directed to a location in front of the passenger for its most effective use. Without airbag system 10 and the cooperation between the guiding strip 16 and the sliding component 28, the airbag would likely only deploy to the side of the passenger and not achieve its full safety benefit. By guiding the airbag to a location central to the passenger, the airbag can be stored to the side, but deployed substantially directly in front of the passenger, and maintain this position while the passenger is moving into the airbag in a crash condition.

Figure 5:
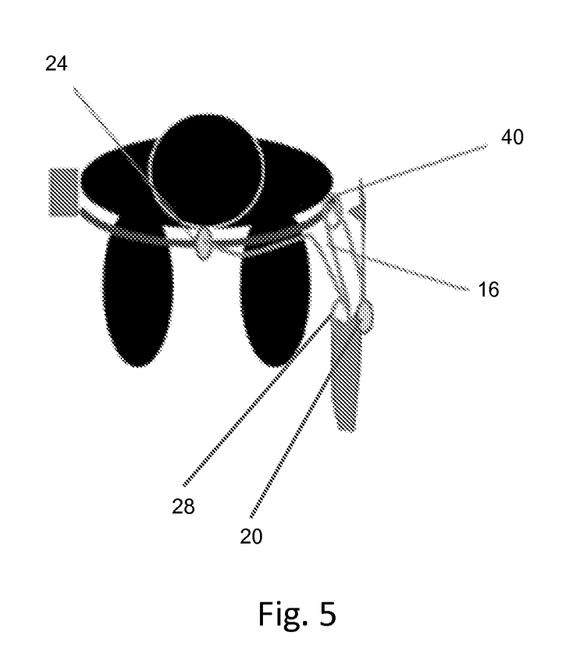
FIG. 5 shows a top plan view of a passenger in a seat that has an alternate airbag system installed thereon.
Figure 6:
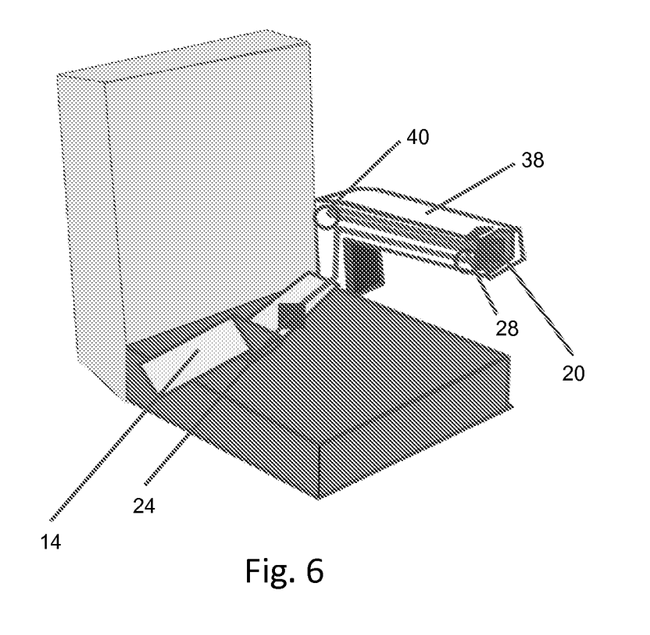
FIG. 6 shows a side perspective view of the seat of FIG. 5.
Figure 8:
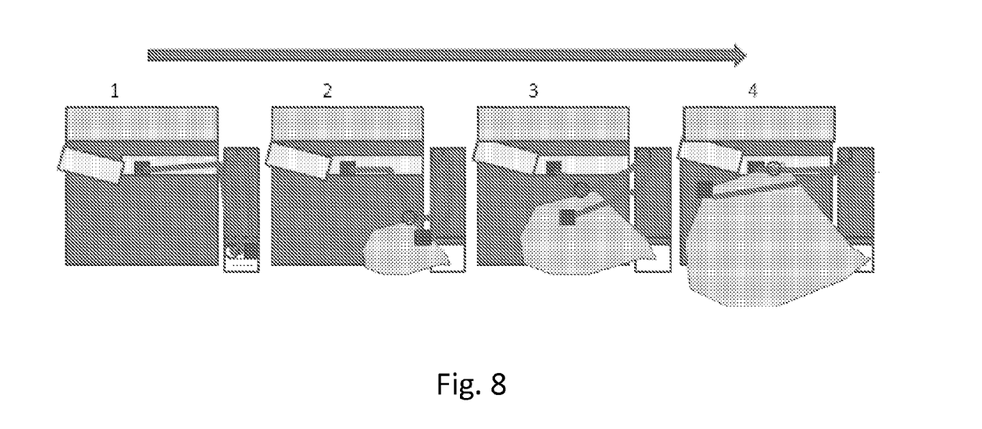
FIG. 8 shows a storyboard of various airbag systems as positioned during airbag deployment.

In an alternate embodiment, the airbag may be stored in a location that is farther away from the passenger. For example, as shown in FIGS. 5 and 6, the airbag 12 may be stored in a far portion of or underneath the arm rest 38. As with the embodiment discussed above, the airbag 12 is fitted with a buckle, ring, or loop that cooperates with a sliding component 28, that travels along a guiding strip 16 in use. The guiding strip 16 for this embodiment may also have two fixed points 20, 24. The first fixed point 20 is positioned on the airbag, and is generally located alongside the passenger. It is secured at a far end of the armrest, the end farthest away from the passenger, as shown in FIG. 6. Fixed point 20 may be secured underneath armrest 38, so as to be out of the way, but easily accessible if required. It is a point at which the guiding strip 16 is fixed to the airbag that moves along with the airbag. The second fixed point 24 is secured along the seat belt 14. In the embodiment shown, the second fixed point 24 is positioned about midway along the length of the seat belt, or at the middle portion 26 of the seat belt. FIGS. 6 and 8 show the fixed points as square points and the guiding component 28 as a circular point. FIG. 8 shows that the guiding strip 16 extends across the seat belt 14 and is folded upon itself in, under, or above the armrest 38. This assists with guiding the airbag, as will be described in more detail below.

A sliding component 28 is provided that can slide or otherwise travel along the guiding strip 16. In the airbag stowage position, shown in FIGS. 5 and 6, the sliding component 28 is positioned at a far end of the armrest. It may be positioned at the side or below the armrest. As shown most clearly in FIG. 7, this sliding component 28 is positioned along the passenger-facing side of the airbag 12, when deployed. It is used to guide the airbag along the guiding strip. As described above, the sliding component 28 is secured or otherwise has some portion connected to the airbag 12, such that movement of the sliding component 28 causes subsequent movement of the airbag 12. A sliding point 40 is provided next to the passenger's elbow. This point 40 may be located on the side of the seat or armrest, under the armrest, or on the side of the seat belt. As shown in FIG. 8, this sliding point 40 actually remains in a fixed position and provides a guiding area or hinge point for the airbag's movement. When the point 20 is moving to the final position together with the airbag cushion, the sliding point 40 causes the guiding strip 16 to become shorter or under tension in order to better maintain the airbag cushion on the passenger body. It is positioned near the passenger's elbow, such as below the armrest 38, or near a junction of the seat back 36 and seat cushions 34.

The airbag 12 is also stowed in the far end of the armrest, closer to where the passenger's hands would rest, as opposed to the elbow. It may be positioned at the end of the armrest, on the side of the armrest, below the armrest, or on the side of the seat. The airbag 12 is generally positioned alongside the passenger, and is associated with the seat or the armrest or both.

Figure 7:
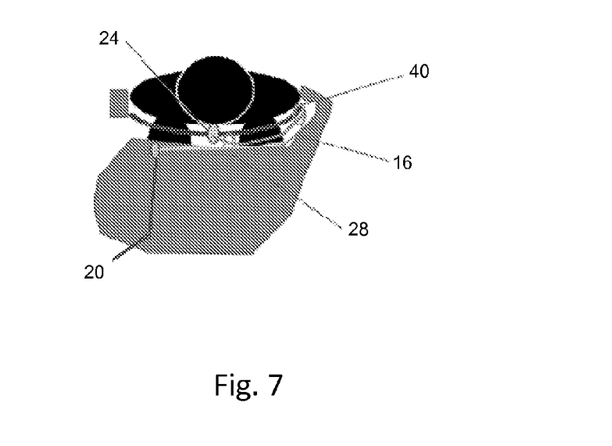
FIG. 7 shows a top plan view of the airbag system of FIG. 5 being deployed.

As shown in FIGS. 7 and 8, when the airbag 12 is to deployed (as indicated by on-board sensors that detect a crash condition or any other deployment system) and expands from the stored position shown to an inflated state, the guiding strip 16 moves from its stowage position and begins to provide a path for the airbag to be guided in front of the passenger. Box 1 of FIG. 8 shows that the strip 16 is fixed at one end to the seat belt, and at its other end on the airbag 12. The strip 16 goes through the sliding point 40 into the arm rest and though the sliding component on the bag. The bag is shown being folded. Box 2 shows that as the bag starts to deploy, the strip 16 begins to be put under tension due to the bag inflation and movement of the fixed point 20 on the airbag. Box 3 shows the bag as it is being inflated and illustrates how the sliding component 28 moves along the guiding strip 16, guided by the seat belt 14. Box 4 shows the airbag in its fully inflated state. The guiding strip 16 is fully under tension, and the sliding component 28 is near the second fixed point 24.

As the airbag deploys, the second fixed point 24 of the guiding strip 16 pulls the strip outwardly and the sliding component 28 travels along the strip 16, guiding the airbag 12 away from the armrest and in front of the passenger. The sliding point 40 provides a hinge and securement point. The first fixed point 20 stays secured to the airbag as it travels. By guiding the airbag to a location central to the passenger, the airbag can be stored to the side, but deployed substantially directly in front of the passenger.

Figure 9:
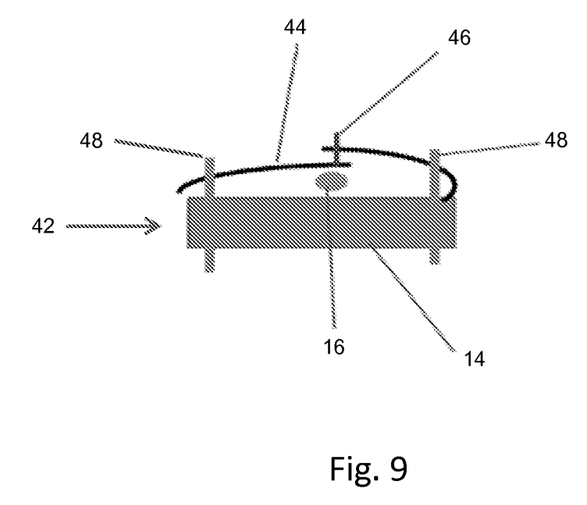
FIGS. 9 and 10 shows covers for the airbag systems described herein.
Figure 10:
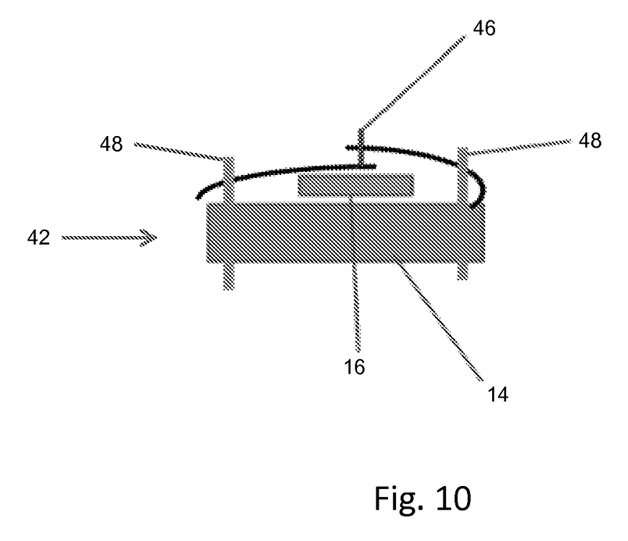

FIGS. 9 and 10 illustrate a cover 42 that may be used in order to cover the guiding strip 16 on the seat belt 14. Cover 42 is generally provided as a soft cover that can break away when the air bag is deployed. The cover 42 may be a cover sock 44 that encloses at least a portion of the belt, particularly the portion along which the guiding strip 16 is located. It is possible for the cover sock 44 to only cover the front portion of the seat belt, or it may encompass the entire seat belt material. The cover 42 may also have a tearing seam 46 positioned above the guiding strip 16, which will allow the cover to tear at the seam 46 when the airbag is deployed, so that the airbag can easily travel along the strip 16. It may be secured at either end of the seat belt 14 at fixation points 48. FIG. 9 illustrates an embodiment with the guiding strip 16 having a rope or a cable shape. FIG. 10 illustrates an embodiment with the guiding strip 16 having a flattened strip shape.

Figure 11:
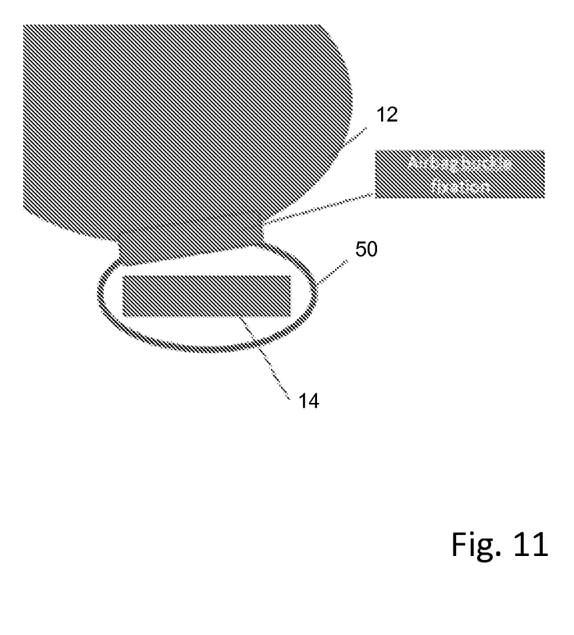
FIG. 11 shows an alternate airbag guiding system.

It should be understood that it is also possible to use the seat belt 14 itself as the guiding strip. In this embodiment, shown in FIG. 11, the airbag is supplied with a sliding element 50, such as a ring or a buckle, that uses the seat belt directly as a guide. The sliding element is fixed to the airbag, slips around the seatbelt, and uses the seat belt as a guide upon deployment. This solution is not expected to work as well as the guiding strip embodiments described above, but it should be understood that it is an alternate option.

Changes and modifications, additions and deletions may be made to the structures and methods recited above and shown in the drawings without departing from the scope or spirit of the invention and the following claims.

What is claimed is:

1. An airbag system for use with a passenger seat having a seat belt and an airbag, comprising:
    (a) a guiding strip configured to be associated with but provided as a separate component from the seat belt, the guiding strip having (i) a first fixed point secured to an area along a side of the passenger, and (ii) a second fixed point secured to the seat belt;
    (b) a sliding component configured to travel along the guiding strip, the sliding component being secured to at least a portion of the airbag.

2. The airbag system of claim 1, wherein the first fixed point is secured along a side of the seat, along an edge of the armrest, or to a side edge the seat belt.

3. The airbag system of claim 1, wherein the second fixed point is positioned at about a middle portion of the seat belt.

4. The airbag system of claim 1, wherein the airbag is positioned alongside the seat in the seat pan, in the seat back, along the armrest, or in the armrest.

5. The airbag system of claim 1, wherein the sliding component is a sliding ring.

6. The airbag system of claim 1, wherein the airbag comprises a buckle or clip to secure it to the sliding component.

7. The airbag system of claim 1, further comprising a cover configured to cover the guiding strip prior to use.

8. The airbag system of claim 7, wherein the cover comprises one or more tearing seams to expose the guiding strip in use.

9. The airbag system of claim 7, wherein the cover is secured at either end of the seat belt.

10. The airbag system of claim 1, wherein the guiding strip comprises the seat belt itself so that in use, the seat belt guides the deployment of the airbag.

11. The airbag system of claim 1, wherein the guiding strip is hinged or secured to the side of the seat or armrest or under the armrest or to the side of the seat belt by a further sliding component, said further sliding component is configured to permit the guiding strip to travel through the further sliding component and guide the deployment of the airbag.

12. An airbag system for use with a passenger seat having a seat belt and an airbag, comprising:
    (a) a guiding strip arranged generally along a similar axis as the seat belt and secured at two fixed points, (i) a first fixed point secured to an area along a side of the passenger, and (ii) a second fixed point secured to the seat belt;
    (b) a sliding component secured to at least a portion of the airbag and positioned near one of the fixed points of the guiding strip prior to airbag deployment, wherein the sliding component cooperates with the guiding strip to permit the sliding component to travel along the guiding strip and guide the deployment of the airbag.

13. The airbag system of claim 12, wherein the guiding strip comprises a cable, cord, or strip.

* * * * *